Oct. 9, 1923.
A. R. SMITH
1,470,123
GARDEN HOSE SUPPORT
Filed Oct. 20, 1921
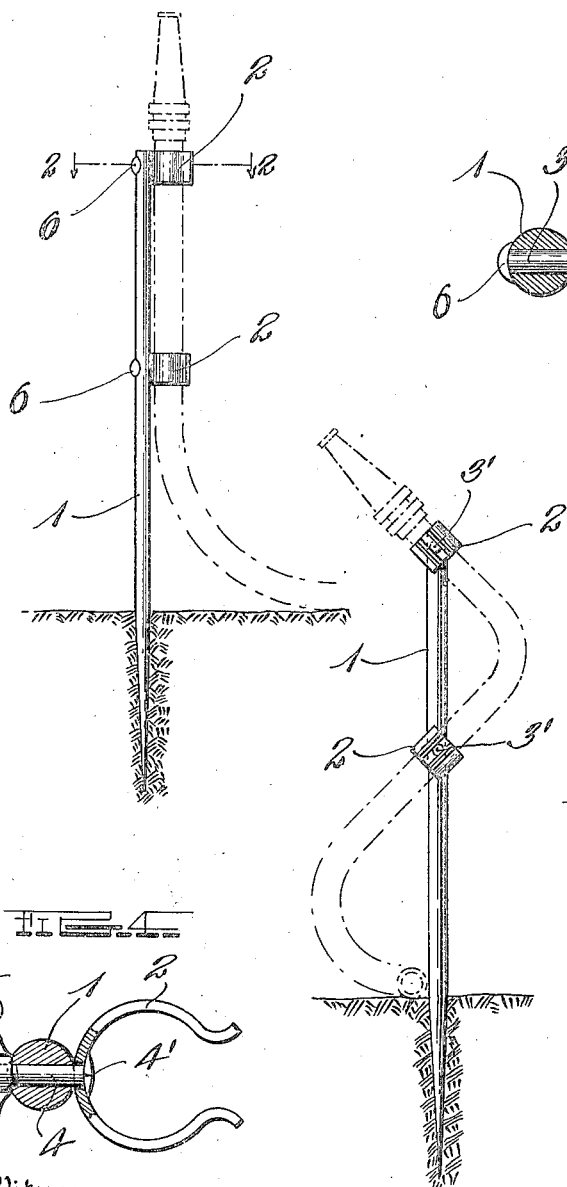
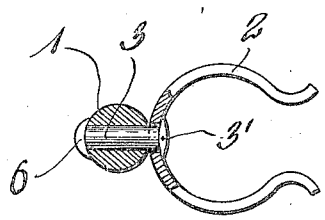
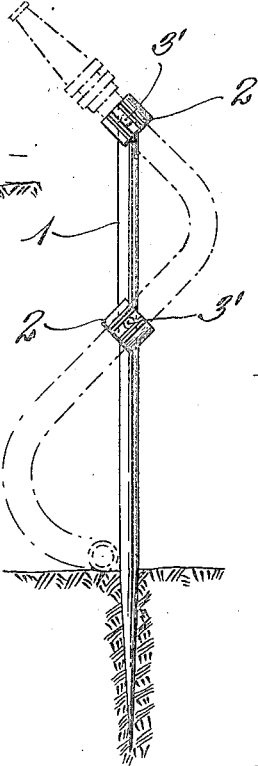
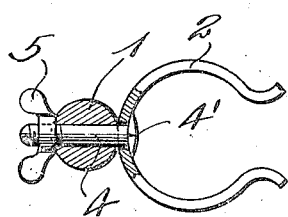

Patented Oct. 9, 1923.

1,470,123

UNITED STATES PATENT OFFICE.

ASHER R. SMITH, OF LAREDO, TEXAS.

GARDEN-HOSE SUPPORT.

Application filed October 20, 1921. Serial No. 509,010.

*To all whom it may concern:*

Be it known that I, ASHER R. SMITH, a citizen of the United States, residing at Laredo, in the county of Webb and State of Texas, have invented certain new and useful Improvements in Garden-Hose Supports; and I do declare the following to be a full, clear, and exact description of the invention, such as will enable others skilled in the art to which it appertains to make and use the same.

This invention relates to an improved hose support for use in supporting a garden hose and one object of the invention is to provide a hose support which is so constructed that clamps for engaging the hose may be connected with a supporting stake and the clamps individually turned when desired so that the hose may be supported with the nozzle extending either in a vertical position or in a horizontal position or at a desired angle between the vertical and horizontal.

Another object of the invention is to so construct this support that the clamps may be connected with the supporting stake by fasteners which pass through the clamps and through the stake and are provided with heads which will engage the clamps and provide frictional binding serving to retain the clamps in the desired position.

Another object of the invention is to so construct this support that it will be very simple in construction and very cheap to produce and to further so construct it that it can be very easily assembled.

This invention is illustrated in the accompanying drawing, wherein:

Figure 1 is a view showing the improved hose support in side elevation with the hose indicated by dotted lines and shown held with the nozzle extending vertically.

Figure 2 is a transverse sectional view through the support taken along the line 2—2 of Fig. 1.

Figure 3 is a view showing the support in front elevation with the hose engaging clips turned at an angle and a hose indicated by dotted lines shown in a position to direct the stream of water out of a vertical position.

Figure 4 is a view similar to Fig. 2 showing a modified form of fastener.

Referring to the accompanying drawing, it will be seen that this support consists of a stake 1 circular in cross section which is to be driven into the ground and hose-engaging clamps or clips 2 which are to be secured in spaced relation against the stake 1 by means of fasteners which may be either rivets as shown at 3 in Fig. 2 or as shown in Fig. 4, bolts 4 having winged nuts 5. From an inspection of Fig. 2, it will be seen that when the rivet is in place and the securing head 6 formed thereon said head being provided with a concave inner face to snugly fit against the surface of the circular stake, the clamps will be secured and that a binding action will be set up between the clamps and the head 3' of this rivet which latter head has a convex inner face to snugly fit against the inner face of the U-shaped clamp. This frictional binding will serve to retain the clamp in the desired position but will permit of the clamp being moved to an adjusted position when so desired. A similar binding action will be set up between the head 4' of the bolt 4 when the securing nut 5 is tightened. It will thus be seen that with this construction, the clamps will be securely held in engagement with the stake but may be turned to a desired position. When manufacturing, it is simply necessary to form the clamps of resilient sheet metal and then after placing the clamps against the stake, pass the fasteners through the clamps and stake and secure the fasteners against removal. A hose support has thus been provided which will have a very simple construction and which will be easy to handle and very efficient in operation.

I claim:

1. A device of the character described comprising a stake circular in cross section, an upper and a lower hose engaging clamp each formed from a strip of resilient sheet metal bent to provide a substantially U-shaped clamp for fitting around a hose and gripping the same, and fasteners passing through the clamps and stake said fasteners constituting pivot pins for mounting the clamps for independent turning adjustment upon the stake, one head of said pins having a convex outer face and a convex inner face to snugly fit the inner surface of the U-shaped clamp, and the other head of said pins having a convex outer face and a concave inner face to snugly fit against the surface of the circular stake, thereby frictionally holding the clamps in set position.

2. A device of the character described comprising a carrier, upper and lower hose engaging clamps each formed from a strip of resilient sheet metal bent to provide a substantially U-shaped clamp for fitting about a hose and gripping the hose, and fasteners passing through the clamps and carrier, said fasteners constituting pivot pins mounting the clamps for independent turning adjustment upon the carrier whereby said clamps may be turned from a position for holding the hose in an upright position to an inclined position for holding the hose with its nozzle extending diagonally.

3. A device of the character described comprising a carrier, and upper and lower hose engaging elements pivotally connected with said carrier, said hose engaging elements being turnable from a position for holding a hose vertically to a position for retaining a hose out of a vertical position.

In testimony whereof I have hereunto set my hand.

ASHER R. SMITH.